United States Patent
Nola

(10) Patent No.: US 9,903,400 B2
(45) Date of Patent: Feb. 27, 2018

(54) POSITIVE RETENTION CLIP FOR SECURING FOAM PARTS

(71) Applicant: Ford Global Technologies, LLC, Dearborn, MI (US)

(72) Inventor: Gary Nola, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/172,324

(22) Filed: Jun. 3, 2016

(65) Prior Publication Data
US 2017/0350430 A1    Dec. 7, 2017

(51) Int. Cl.
*B62C 99/00* (2009.01)
*F16B 2/22* (2006.01)
*B60R 13/08* (2006.01)

(52) U.S. Cl.
CPC ............. *F16B 2/22* (2013.01); *B60R 13/0838* (2013.01); *B60R 2013/0807* (2013.01)

(58) Field of Classification Search
CPC ........ B60R 13/0838; B60R 2013/0807; F16B 2/22
See application file for complete search history.

(56) References Cited

U.S. PATENT DOCUMENTS

| | | | |
|---|---|---|---|
| 2,068,392 A | 1/1937 | Acker | |
| 2,868,489 A | 1/1959 | Calcut | |
| 4,119,285 A | 10/1978 | Bisping et al. | |
| 4,779,313 A * | 10/1988 | Gonas | B60R 13/0206 24/289 |
| D302,938 S * | 8/1989 | Fujioka | D8/356 |
| D510,257 S * | 10/2005 | Marty | D8/356 |
| 7,490,727 B2 * | 2/2009 | Spiers | A47F 7/0028 211/70.6 |
| 7,823,594 B2 * | 11/2010 | Defenbaugh | A45D 8/20 132/273 |
| D632,554 S * | 2/2011 | Grzyb | D8/395 |
| D690,583 S * | 10/2013 | Sendra-Gonzalez | F24J 2/5203 D8/394 |
| 2002/0071718 A1* | 6/2002 | Marty | F16L 37/1225 403/293 |
| 2009/0242715 A1* | 10/2009 | Kosidlo | F16B 2/243 248/231.81 |
| 2013/0015288 A1 | 1/2013 | Hernandez et al. | |

* cited by examiner

Primary Examiner — Lori L Lyjak
(74) Attorney, Agent, or Firm — LeClairRyan

(57) ABSTRACT

A single piece retention clip for attaching a foam part to a substrate is disclosed. The retention clip includes a pair of spaced apart and opposed curvilinear retention clip arms, a planar foam part retaining member, and a bridge having first and second ends. The first bridge end extends from the planar foam part retaining member. The clip arms are flexibly attached to the second bridge end. The insulation part is captured between the planar foam part retaining member and the clip arms, prior to attachment of the clip to the substrate. An operator-usable handle to facilitate clip insertion and removal relative to the substrate may be formed on the foam part retaining member. Each clip arm includes a body having wide and narrow parts. The wide part of each of clip arm is attached to the bridge. A hook is formed at the narrow part of each arm.

20 Claims, 5 Drawing Sheets

POSITIVE RETENTION CLIP FOR SECURING FOAM PARTS

TECHNICAL FIELD

The disclosed inventive concept relates to positive retention clips for attaching electrical conduits, fluid-carrying lines or fluid-carrying tubes to a foam substrate. More particularly, the disclosed inventive concept relates to a retention clip for attaching electrical conduits, fluid-carrying lines or fluid-carrying tubes to a substrate such as a foam substrate on a vehicle. The positive retention clip includes a upper portion having a planar attachment part that attaches to the foam substrate and a lower portion having opposed arms that retain the conduit, line or tube.

BACKGROUND OF THE INVENTION

It is the inherent nature of automotive vehicles that different components emit sounds and vibrations that are unpleasant to the vehicle occupants. Various approaches have been undertaken to deaden these sounds and vibrations including, for example, insulating coatings for direct application to a substrate and foam segments. As a general matter, however, the insulating characteristics of foam parts are superior to insulating coatings and offer flexibility not provided for in most coatings.

It is important that the foam parts are secured in place in strategic locations in the vehicle to prevent their being dislodged. A variety of approaches have been taken to secure the foam part in place on the substrate. One approach taken is to use an adhesive to hold the foam part to the substrate. However, the use of an adhesive prohibits the convenient removal of the foam part when needed for repair or vehicle maintenance without destroying the part.

A common alternative to adhesives to holding a foam part to a vehicle substrate is the use of one or more mechanical fasteners. Examples of such fasteners include nuts and bolts, ball studs and grommets, zip ties, or hook and loop fasteners such as those sold under the brand name VELCRO®. While providing a certain degree of effectiveness, these solutions suffer certain disadvantages. These mechanical fasteners are frequently not customer friendly and can be difficult to install. In addition, they frequently are not serviceable, are not robust, or are expensive. In addition, some of these mechanical fasteners require over-molding which presents manufacturing limits. Furthermore, very often mechanical fasteners damage the foam parts when removed for servicing or even during vehicle operation. Typically the mechanical fasteners are made of metal and thus are susceptible to metal corrosion at the point of contact as water, and in certain driving conditions, road salt tend to accumulate at the point of contact, leading to failure. Many times a mechanical part suffers from several of these disadvantages.

Accordingly, known approaches to attaching a foam part to a substrate or to the substructure of a vehicle have not produced satisfactory results. As in so many areas of vehicle technology, there is always room for improvement related to systems that convey fluids in the automotive vehicle.

SUMMARY OF THE INVENTION

The disclosed inventive concept provides a single piece clip for attaching a foam part to a substrate. The retention clip of the disclosed inventive concept overcomes the problems of known methods of attaching a foam part to a substrate that provides a corrosion-resistant retention clip that is flexible and easily fitted to the substrate. The disclosed inventive concept provides a single piece clip that is designed to secure foam parts as a form of positive retention. The clip is easy to install into foam parts and is also easy to engage with the component to which the foam part will be attached. The retention clip is configured to prevent ripping of the foam either during servicing of the vehicle or during normal operation of the vehicle.

Particularly, the retention clip of the disclosed inventive concept for attaching an insulation part to a substrate is provided in two embodiments. Each embodiment includes a pair of spaced apart and opposed curvilinear retention clip arms, a planar foam part retaining member, and a bridge having a first end and a second end. The first end of the bridge extends from the planar foam part retaining member. The clip arms are flexibly attached to the second end of the bridge. The insulation part is captured between the planar foam part retaining member and the clip arms, preferably prior to attachment of the retention clip to the substrate. The retention clip may be composed of a polymerized material such as a plastic.

A variation of the retention clip of the disclosed inventive concept, the second embodiment, includes an operator-usable handle to facilitate insertion and removal of the retention clip relative to the substrate. The operator-usable handle comprises an upper arm attached to an upper arm attachment member. The upper arm attachment member is attached to the planar foam part retaining member.

Each of the clip arms includes a body having a wide part and a narrow part. The wide part of each of clip arm is attached to the bridge. A hook is formed at the narrow part of each arm. The hooked ends function as safety catches in the event that the retention clip arms of the retention clip become disengaged from the substrate hole.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
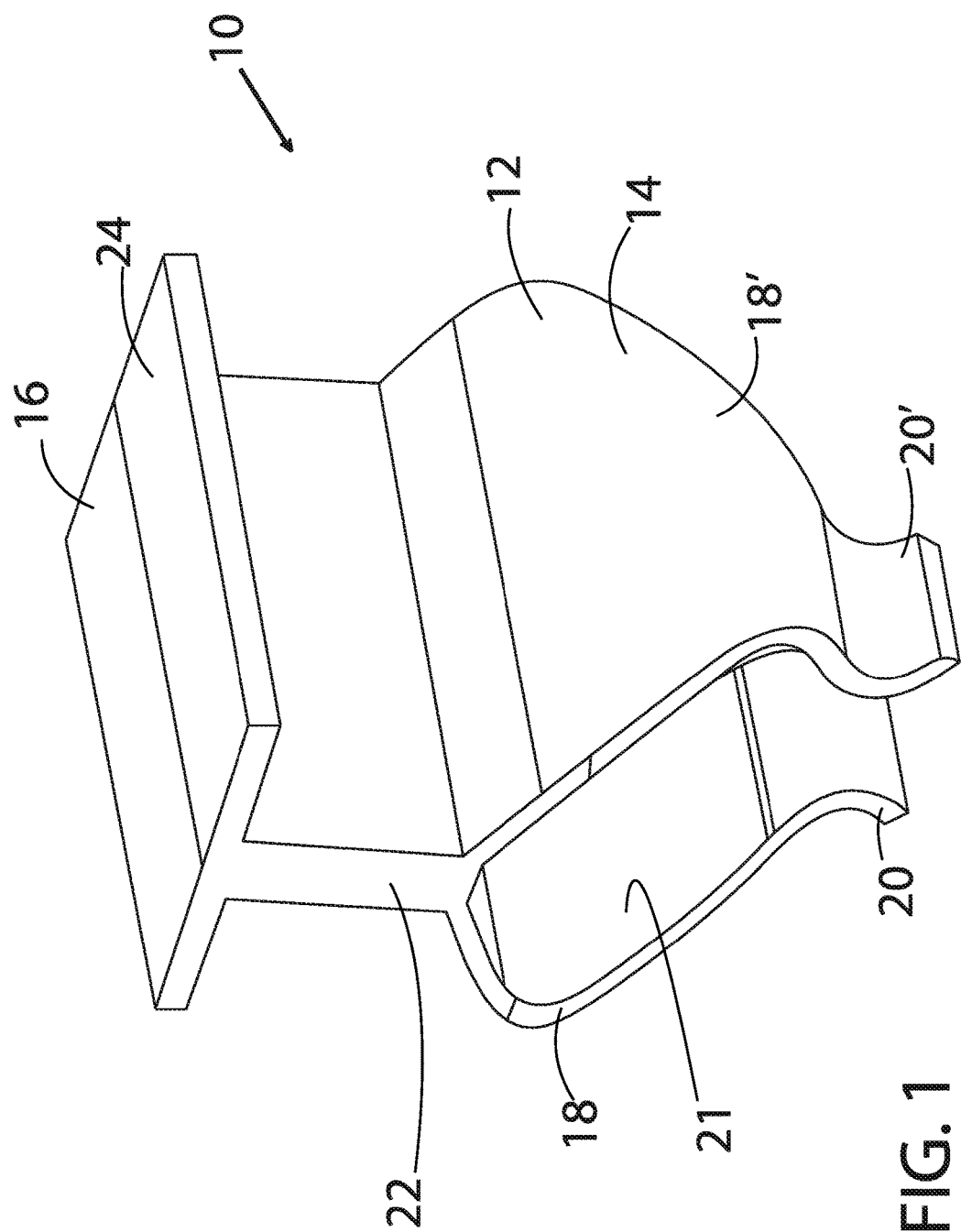
FIG. 1 is a perspective view of a retention clip according to an embodiment of the disclosed inventive concept.

In the following figures, the same reference numerals will be used to refer to the same components. In the following description, various operating parameters and components are described for different constructed embodiments. These specific parameters and components are included as examples and are not meant to be limiting.

Figure 2:
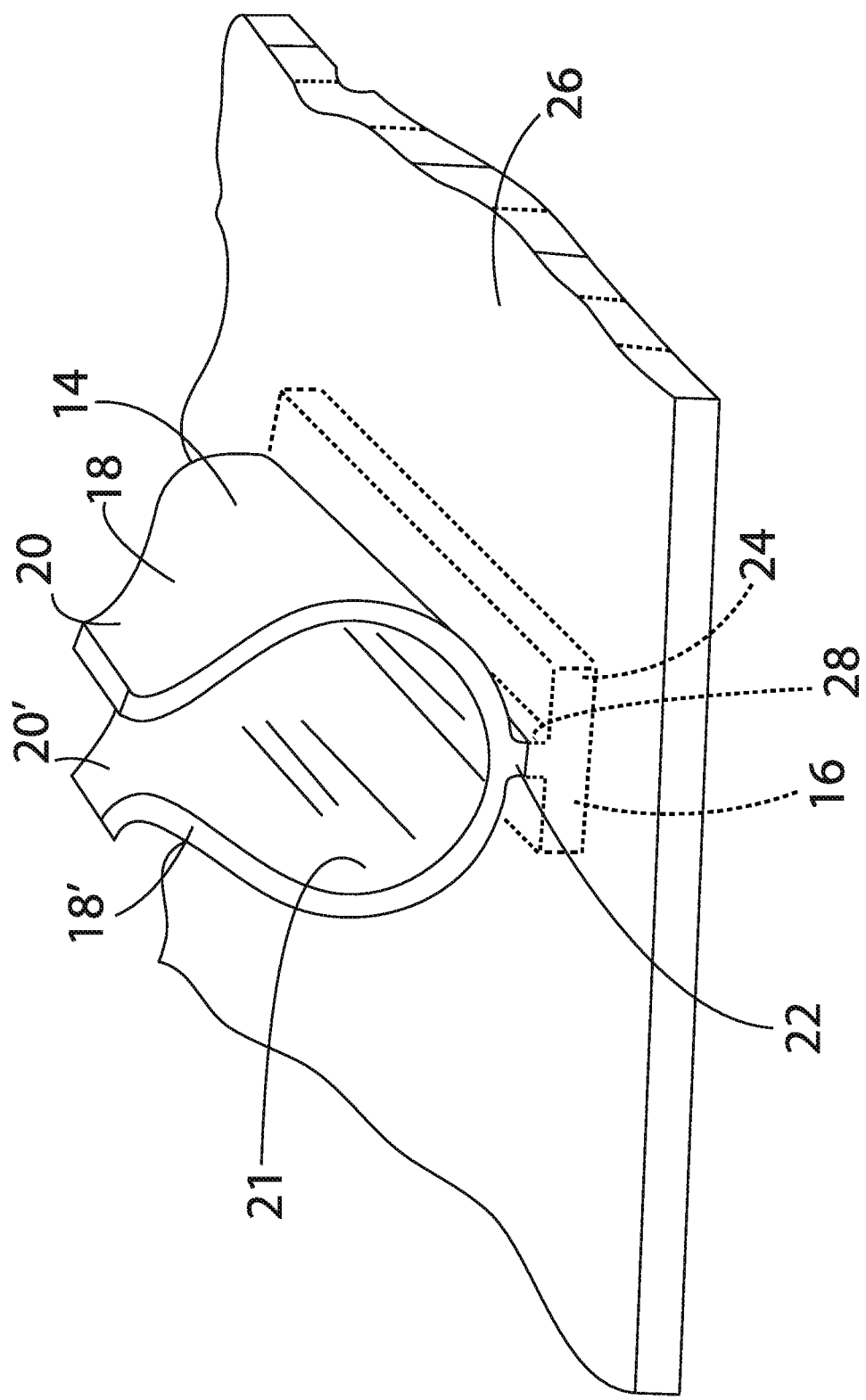
FIG. 2 is a perspective view of the retention clip according to the embodiment illustrated in FIG. 1 showing the retention clip attached to the foam part prior to attachment to a substrate.
Figure 3:
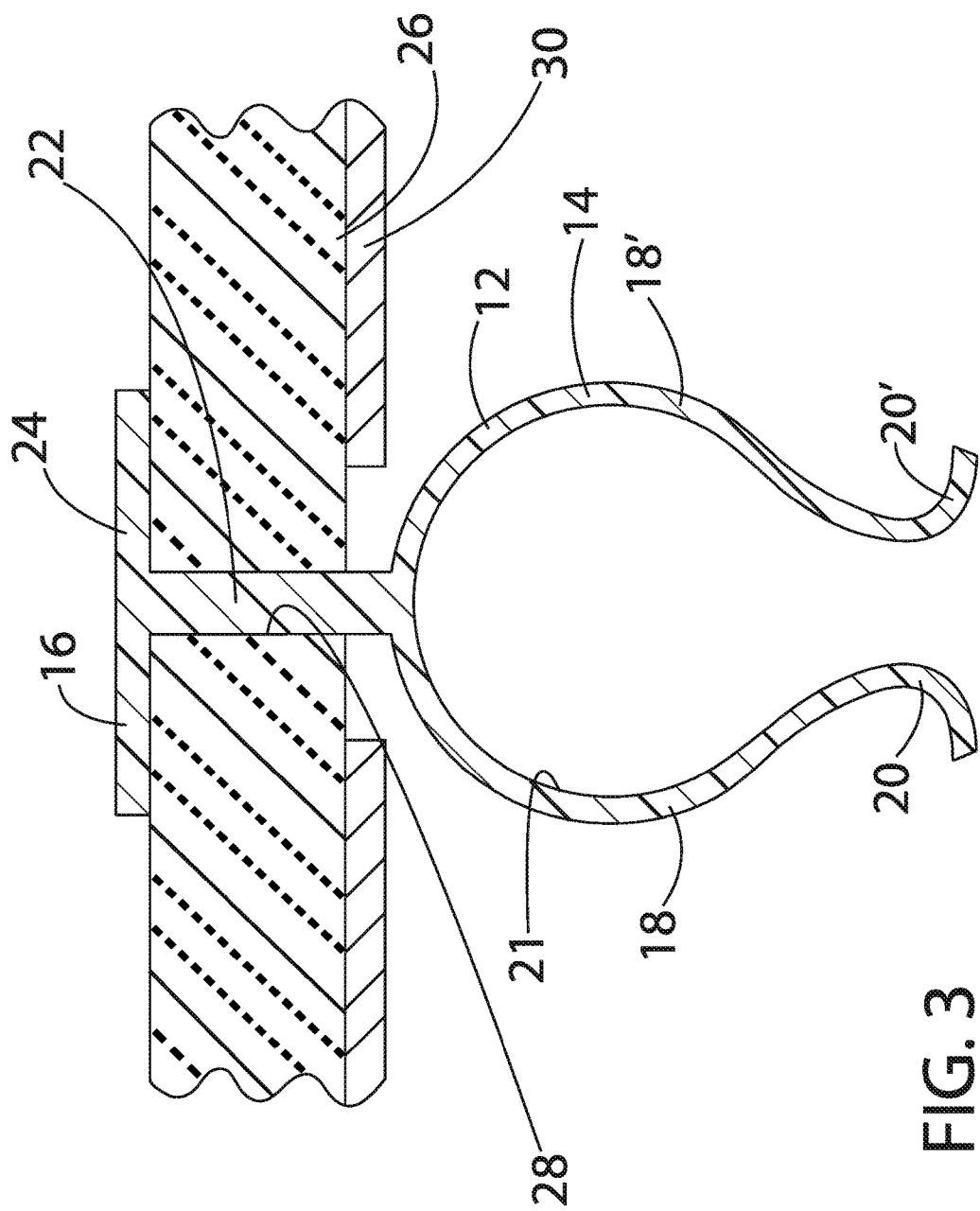
FIG. 3 is a sectional view of the retention clip according to the embodiment illustrated in FIG. 1 in place on a substrate retaining an attached insulating foam part.
Figure 4:
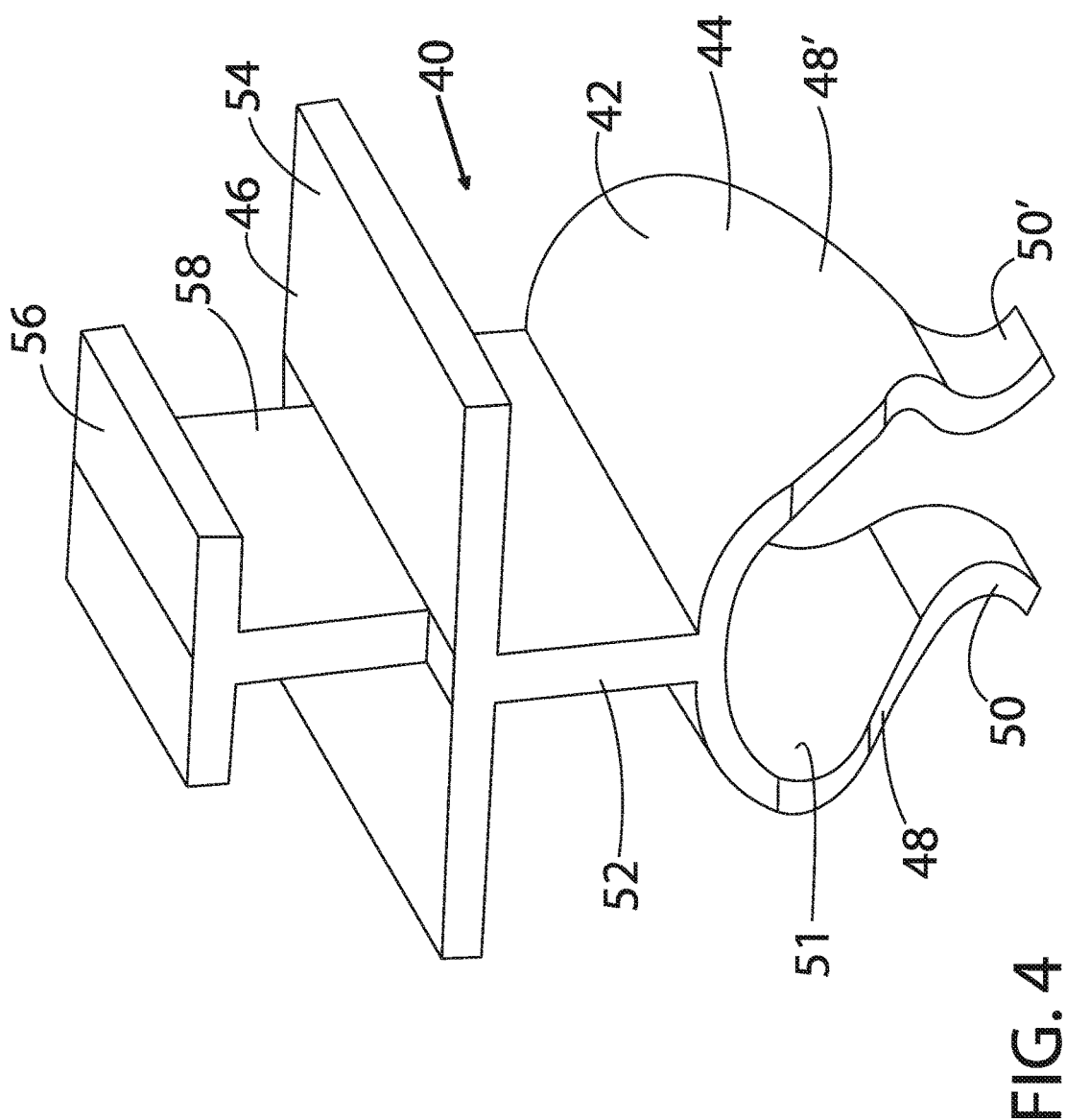
FIG. 4 is a perspective view of a retention clip according to another embodiment of the disclosed inventive concept.
Figure 5:
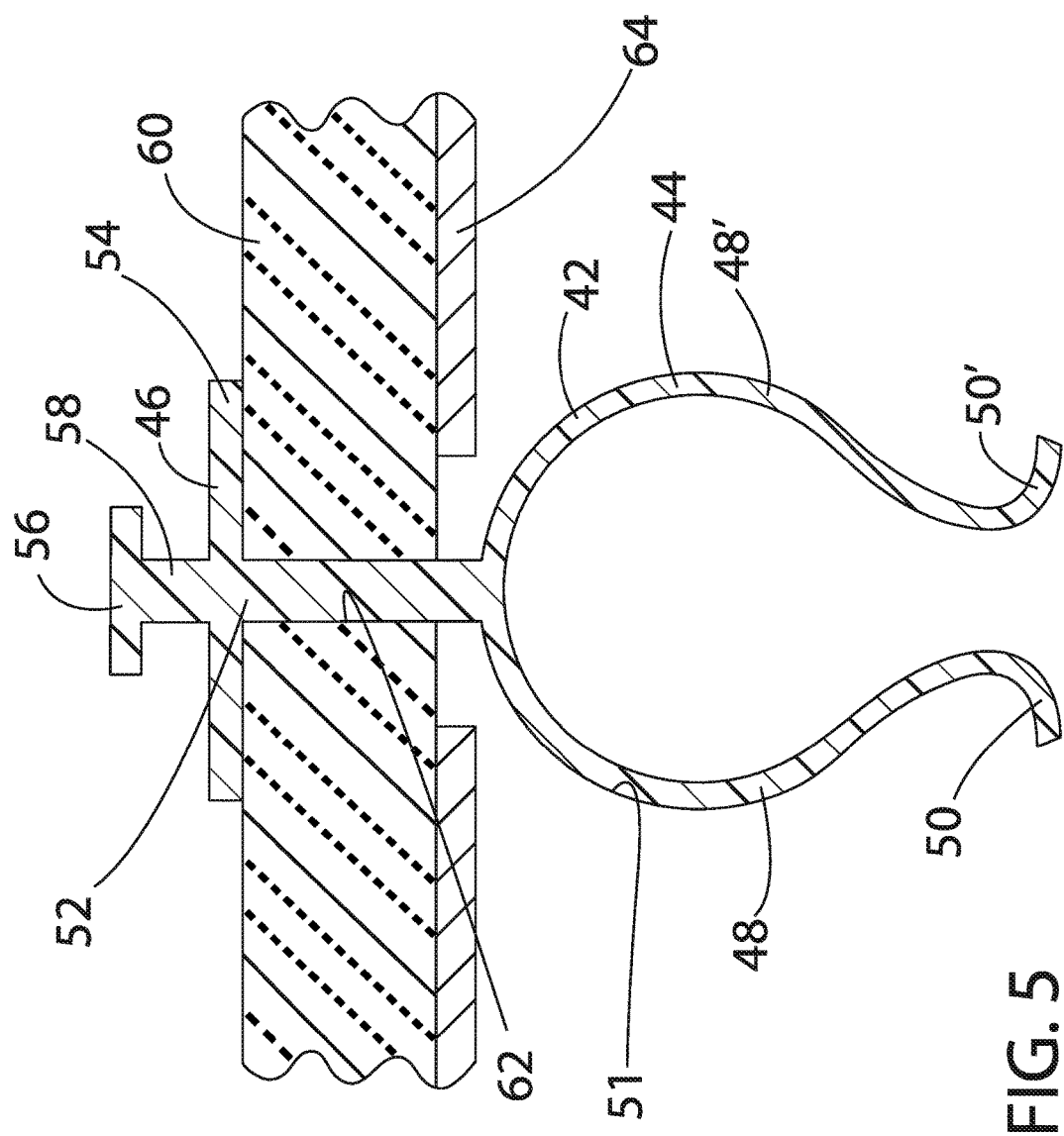
FIG. 5 is a sectional view of the retention clip according to the embodiment illustrated in FIG. 4 in place on a substrate retaining an attached insulating foam part.

The accompanying figures and the associated description illustrate the retention clip according to two embodiments of the disclosed inventive concept. The embodiments of the disclosed inventive concept are illustrated as being both isolated and attached to a foam part. In general, FIGS. 1 through 3 illustrate one embodiment of the retention clip according to the disclosed inventive concept while FIGS. 4 and 5 illustrate another embodiment of the disclosed inventive concept. It is to be understood that the shapes of the embodiments of the retention clips illustrated in the figures is only illustrative as other shapes may be possible without deviating from the spirit and scope of the disclosed inventive concept.

Referring to FIG. 1, a perspective view of a retention clip according to an embodiment of the disclosed inventive concept, generally illustrated as 10, is shown. The retention clip 10 is formed from any one of several polymerized materials including, without limitation, a molded plastic.

The retention clip 10 includes a retention clip body 12 defined by a retention clip body lower portion 14 and a retention clip body upper portion 16. The retention clip body lower portion 14 is configured for attachment to a substrate such as an inner surface of the engine compartment of a motor vehicle. The retention clip body upper portion 16 is configured for attachment to a foam insulating part.

The retention clip body lower portion 14 includes a pair of opposed and spaced apart retention clip arms 18 and 18'. The retention clip arm 18 includes a hooked end 20 and the retention clip arm 18' includes a hooked end 20'. The retention clip arms 18 and 18' are flexibly attached to one another. The hooked ends 20 and 20' function as safety catches in the event that the retention clip arms 18 and 18' of the retention clip 10 become disengaged from the substrate hole.

The opposed and spaced apart retention clip arms 18 and 18' define a space 21 therebetween. The space 21 allows for movement of the retention clip arms 18 and 18' toward one another when the retention clip 10 is attached to a substrate by insertion into an attachment hole.

The retention clip body upper portion 16 includes a bridge 22 connected at one end to the retention clip arms 18 and 18' and at the other end to a planar foam part retaining member 24. The length of the bridge 22 is proportioned for foam parts of different thicknesses.

Referring to FIG. 2, a perspective view of the retention clip 10 is illustrated in its general position attached to an insulation foam part 26 prior to attachment to a substrate. The bridge 22 is fitted through a slit 28 formed in the insulation foam part 26 to secure attachment of the retention clip 10 to the foam part 26. The slit 28 is wide enough so that the planar foam part retaining member 24 may be inserted without damaging the foam part 26.

Once the retention clip 10 is attached to the foam part 26, the retention clip 10 is attached to a substrate. As illustrated in FIG. 3, the retention clip 10, now attached to the insulation foam part 26, is shown in cross-section as being attached to a substrate 30. It is to be understood that while the substrate 30 is illustrated as being a metal, the substrate 30 may be any structural component of the vehicle.

The configuration of the retention clip 10 in FIGS. 1, 2 and 3 is illustrated in its unstressed state such that the retention clip arms 18 and 18' are fully spaced apart. Upon insertion into the attachment hole, the retention clip arms 18 and 18' are forced toward one another into their stressed state, closing the space 21 therebetween. Upon full insertion into the substrate hole, the retention clip 10 the retention clip arms 18 and 18' return to their unstressed state to thereby retain the retention clip 10. The attachment of the retention clip 10 to the substrate 30 is illustrated in cross-section in FIG. 3. The insulation foam part 26 is thus securely attached to the substrate 30.

As noted previously, the disclosed inventive concept appears in two configurations which are illustrated in FIGS. 1, 2 and 3 and are described in conjunction therewith. The other configuration is illustrated in FIGS. 4 and 5.

Referring to FIG. 4, a perspective view of a retention clip according to another embodiment of the disclosed inventive concept, generally illustrated as 40, is shown. The retention clip 40 is formed from any one of several polymerized materials including, without limitation, a molded plastic.

The retention clip 40 includes a retention clip body 42 defined by a retention clip body lower portion 44 and a retention clip body upper portion 46. The retention clip body lower portion 44 is configured for attachment to a substrate such as an inner surface of the engine compartment of a motor vehicle. The retention clip body upper portion 46 is configured for attachment to a foam insulating part.

The retention clip body lower portion 44 includes a pair of opposed and spaced apart retention clip arms 48 and 48'. The retention clip arm 48 includes a hooked end 50 and the retention clip arm 48' includes a hooked end 50'. The retention clip arms 48 and 48' are flexibly attached to one another. The hooked ends 50 and 50' function as safety catches in the event that the retention clip arms 48 and 48' of the retention clip 40 become disengaged from the substrate hole.

The opposed and spaced apart retention clip arms 48 and 48' define a space 51 therebetween. The space 51 allows for movement of the retention clip arms 48 and 48' toward one another when the retention clip 40 is attached to a substrate by insertion into an attachment hole.

The retention clip body upper portion 46 includes a bridge 52 connected at one end to the retention clip arms 48 and 48' and at the other end to a planar foam part retaining member 54. The length of the bridge 52 is proportioned for foam parts of different thicknesses.

To facilitate simple attachment and removal of the retention clip 40 to and from a substrate, the embodiment of the retention clip 40 shown in FIGS. 4 and 5 includes an operator-usable handle that includes an upper arm 56 that is attached to an upper arm attachment member 58. The upper arm attachment member 58 is attached to the planar foam part retaining member 54.

The attachment of the retention clip 40 to an insulation foam part 60 is illustrated in sectional view in FIG. 5. As illustrated, the bridge 52 is fitted through a slit 62 formed in the insulation foam part 60. The slit 62 is wide enough so that the planar foam part retaining member 54 may be inserted without damaging the insulation foam part 60.

Once the retention clip 40 is attached to the foam part 60, the retention clip 40 is attached to a substrate. As illustrated in FIG. 5, the retention clip 40, now attached to the insulation foam part 60, is shown in cross-section as being attached to a substrate 64. It is to be understood that while the substrate 64 is illustrated as being a metal, the substrate 640 may be any structural component of the vehicle.

The configuration of the retention clip 40 in FIGS. 4 and 5 is illustrated in its unstressed state such that the retention clip arms 48 and 48' are fully spaced apart. Upon insertion into the attachment hole, the retention clip arms 48 and 48' are forced toward one another into their stressed state, closing the space 51 therebetween. Upon full insertion into the substrate hole, the retention clip 40, the retention clip arms 48, and 48' return to their unstressed state to thereby retain the retention clip 40. The attachment of the retention clip 40 to the substrate 64 is illustrated in FIG. 5. The insulation foam part 60 is thus securely attached to the substrate 64.

Thus, the disclosed invention as set forth above overcomes the challenges faced by known approaches to attaching insulating foam parts to different substrates on a vehicle in such a way that the foam part is neither damaged upon removal nor in operation. The retention clip is of relatively low cost to manufacture and thus helps to keep manufacturing expenses to a minimum. In addition, the retention clip is easy to attach and detach, thus minimizing time required for servicing the vehicle. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A retention clip for attaching an insulation part to a substrate on a vehicle comprising:
   a pair of spaced apart and opposed curvilinear retention clip arms;
   a planar foam part retaining member; and
   a bridge having a first end and a second end, said first end extending from said planar foam part retaining member, said clip arms being flexibly attached to said second end of said bridge.

2. The retention clip for attaching an insulation part to a substrate of claim 1, further including an operator-usable handle.

3. The retention clip for attaching an insulation part to a substrate of claim 2, wherein said operator-usable handle comprises an upper arm attached to an upper arm attachment member, said upper arm attachment member being attached to said planar foam part retaining member.

4. The retention clip for attaching an insulation part to a substrate of claim 1, wherein each of said arms includes a hooked end.

5. The retention clip for attaching an insulation part to a substrate of claim 1, wherein the retention clip is composed of a polymerized material.

6. The retention clip for attaching an insulation part to a substrate of claim 1, wherein the insulation part is fitted between said pair of spaced apart and opposed curvilinear retention clip arms and said planar foam part retaining member.

7. The retention clip for attaching an insulation part to a substrate of claim 1, wherein each of said clip arms includes a body having a wide part and a narrow part.

8. The retention clip for attaching an insulation part to a substrate of claim 7, wherein said wide part of each of said clip arms is attached to said bridge.

9. A system for attaching an insulation part to a vehicle substrate, the system comprising:
   a substrate having a retention clip hole;
   an insulation part having a retention clip slit;
   a retention clip including a pair of opposed curvilinear retention clip arms, a planar foam part retaining member, and a bridge having first and second ends, said first bridge end extending from said retaining member, said clip arms being flexibly attached to said second bridge end.

10. The system for attaching an insulation part to a vehicle substrate of claim 9, wherein said retention clip further includes an operator-usable handle.

11. The system for attaching an insulation part to a vehicle substrate of claim 10, wherein said operator-usable handle comprises an upper arm attached to an upper arm attachment member, said upper arm attachment member being attached to said planar foam part retaining member.

12. The system for attaching an insulation part to a vehicle substrate of claim 9, wherein each of said arms includes a hooked end.

13. The system for attaching an insulation part to a vehicle substrate of claim 9, wherein the retention clip is composed of a polymerized material.

14. The system for attaching an insulation part to a vehicle substrate of claim 9, wherein said insulation part is fitted between said pair of spaced apart and opposed curvilinear retention clip arms and said planar foam part retaining member.

15. The system for attaching an insulation part to a vehicle substrate of claim 9, wherein each of said clip arms includes a body having a wide part and a narrow part.

16. The system for attaching an insulation part to a vehicle substrate of claim 15, wherein said wide part of each of said clip arms is attached to said bridge.

17. A retention clip for attaching an insulation part to a substrate on a vehicle comprising:
   a substrate attachment end including a pair of spaced apart and opposed curvilinear retention clip arms;
   an insulation part attachment end including a planar foam part retaining member; and
   a bridge having first and second ends, said first end extending from said planar foam part retaining member, said clip arms being flexibly attached to said second end of said bridge.

18. The retention clip for attaching an insulation part to a substrate of claim 17, further including an operator-usable handle comprising an upper arm attached to an upper arm attachment member, said upper arm attachment member being attached to said planar foam part retaining member.

19. The retention clip for attaching an insulation part to a substrate of claim 17, wherein each of said arms includes a hooked end.

20. The retention clip for attaching an insulation part to a substrate of claim 17, wherein each of said clip arms includes a body having a wide part and a narrow part, said wide part of each of said clip arms is attached to said bridge.

* * * * *